United States Patent
Prakash et al.

(10) Patent No.: US 9,810,892 B2
(45) Date of Patent: Nov. 7, 2017

(54) OPTICAL LENS FABRICATION

(71) Applicant: THE BOARD OF TRUSTEES OF THE LELAND STANFORD JUNIOR UNIVERSITY, Palo Alto, CA (US)

(72) Inventors: Manu Prakash, San Francisco, CA (US); James S. Cybulski, Palo Alto, CA (US); Laurel Kroo, Stanford, CA (US)

(73) Assignee: THE BOARD OF TRUSTEES OF THE LELAND STANFORD JUNIOR UNIVERSITY, Palo Alto, CA (US)

( * ) Notice: Subject to any disclaimer, the term of this patent is extended or adjusted under 35 U.S.C. 154(b) by 154 days.

(21) Appl. No.: 14/773,845

(22) PCT Filed: Mar. 10, 2014

(86) PCT No.: PCT/US2014/022652
§ 371 (c)(1),
(2) Date: Sep. 9, 2015

(87) PCT Pub. No.: WO2014/150232
PCT Pub. Date: Sep. 25, 2014

(65) Prior Publication Data
US 2016/0025957 A1 Jan. 28, 2016

Related U.S. Application Data

(60) Provisional application No. 61/790,436, filed on Mar. 15, 2013.

(51) Int. Cl.
*G02B 3/00* (2006.01)
*G02B 9/00* (2006.01)
(Continued)

(52) U.S. Cl.
CPC ........ *G02B 21/02* (2013.01); *B29D 11/00365* (2013.01); *B29D 11/00432* (2013.01);
(Continued)

(58) Field of Classification Search
CPC ...... G02B 21/02; G02B 3/0087; G02B 5/005; G02B 21/0008; G02B 3/00; B29D 11/00432; B29D 11/00365
See application file for complete search history.

(56) References Cited

U.S. PATENT DOCUMENTS 2,789,460 A    4/1957   Kaufman
2,986,830 A    6/1961   Underberg et al.
(Continued)

FOREIGN PATENT DOCUMENTS

DE    2644949 A1    4/1977
DE    19531819 A1    2/1997
(Continued)

OTHER PUBLICATIONS

Lorusso et al.; Experimental resolution measurement in critical dimension scanning electron microscope metrology; Scanning; 25(4); Dec. 6, 2003 (Abstract Only).

*Primary Examiner* — Alicia M Harrington
(74) *Attorney, Agent, or Firm* — Shay Glenn LLP

(57) ABSTRACT

Optical lenses and methods for manufacturing optical lenses are disclosed herein. Lenses having a reduced aperture size are also disclosed herein along with methods for making the same. The optical lenses disclosed herein can be made having improved optical properties. The lenses can be used in optical microscopes, including optical microscopes with a shorter optical path relative to conventional optical microscopes.

20 Claims, 17 Drawing Sheets

GRIN lens with quadratic profile is preferable for reducing the spherical aberration.

(51) Int. Cl.
*G02B 21/02* (2006.01)
*G02B 21/00* (2006.01)
*B29D 11/00* (2006.01)
*G02B 5/00* (2006.01)

(52) U.S. Cl.
CPC ............ *G02B 3/0087* (2013.01); *G02B 5/005* (2013.01); *G02B 21/0008* (2013.01); *G02B 3/00* (2013.01)

(56) References Cited

U.S. PATENT DOCUMENTS

| | | | |
|---|---|---|---|
| 3,562,939 A | 2/1971 | Jacobs et al. | |
| 3,734,596 A | 5/1973 | Nerlich | |
| 3,756,699 A | 9/1973 | Martin | |
| 3,900,252 A | 8/1975 | Di Salvo et al. | |
| 4,095,874 A | 6/1978 | Wallace | |
| 4,357,073 A | 11/1982 | Carver | |
| 4,435,912 A | 3/1984 | Adrian et al. | |
| 4,568,148 A | 2/1986 | Onanian | |
| 4,729,635 A | 3/1988 | Saferstein et al. | |
| 4,737,016 A | 4/1988 | Russell et al. | |
| 4,945,220 A | 7/1990 | Mallory et al. | |
| 5,062,697 A | 11/1991 | Mitchell | |
| 5,198,927 A | 3/1993 | Rathbone et al. | |
| 5,969,852 A | 10/1999 | Kung | |
| 6,614,604 B1 | 9/2003 | Budde | |
| 6,738,191 B1 | 5/2004 | Onanian | |
| 6,847,480 B2 | 1/2005 | Steenblik et al. | |
| 8,111,464 B2 | 2/2012 | Lee et al. | |
| 2002/0048729 A1 | 4/2002 | Nishikawa et al. | |
| 2002/0173045 A1 | 11/2002 | Schwartz | |
| 2003/0095340 A1 | 5/2003 | Atwater et al. | |
| 2004/0095641 A1 | 5/2004 | Russum et al. | |
| 2004/0142386 A1 | 7/2004 | Rigler et al. | |
| 2006/0028717 A1 | 2/2006 | Dunn | |
| 2006/0254316 A1* | 11/2006 | Leu | G02B 3/0087 65/30.13 |
| 2008/0144192 A1 | 6/2008 | Choi et al. | |
| 2008/0213495 A1 | 9/2008 | Miyauchi et al. | |
| 2010/0073766 A1 | 3/2010 | Angros | |
| 2010/0091364 A1 | 4/2010 | Wozniak | |
| 2010/0259805 A1 | 10/2010 | Osipchuk | |
| 2010/0284066 A1 | 11/2010 | Dunning et al. | |
| 2011/0043796 A1 | 2/2011 | Markwort et al. | |
| 2014/0368816 A1 | 12/2014 | Prakash et al. | |

FOREIGN PATENT DOCUMENTS

| | | |
|---|---|---|
| GB | 2210177 A | 6/1989 |
| JP | 2003294419 A | 10/2003 |
| KR | 1020090059419 A | 6/2009 |
| WO | WO 00/20898 A2 | 4/2000 |

\* cited by examiner

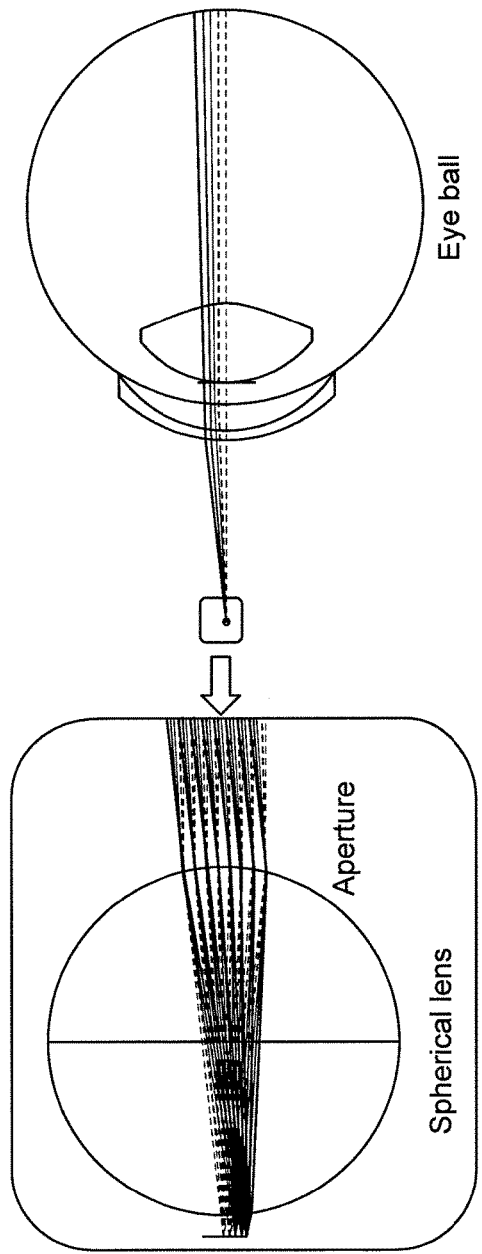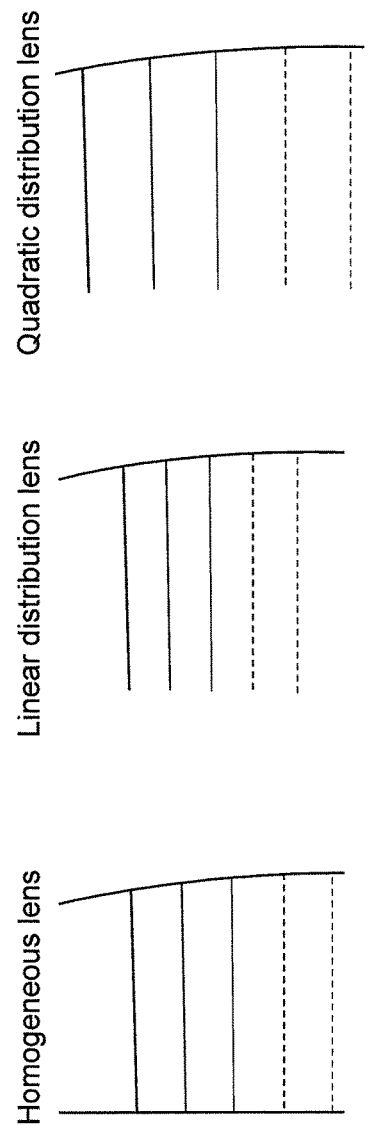
FIG. 3
GRIN lens with quadratic profile is preferable for reducing the spherical aberration.

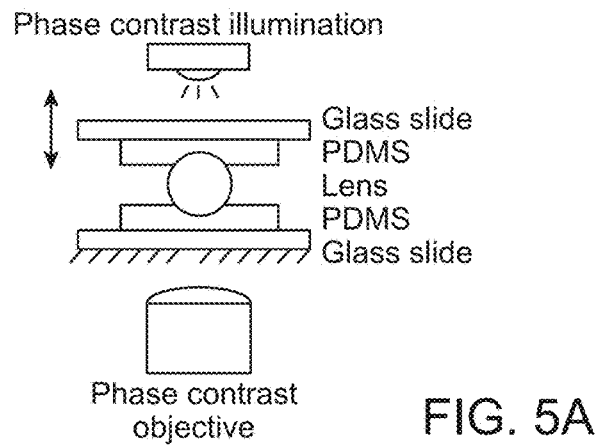
FIG. 5A
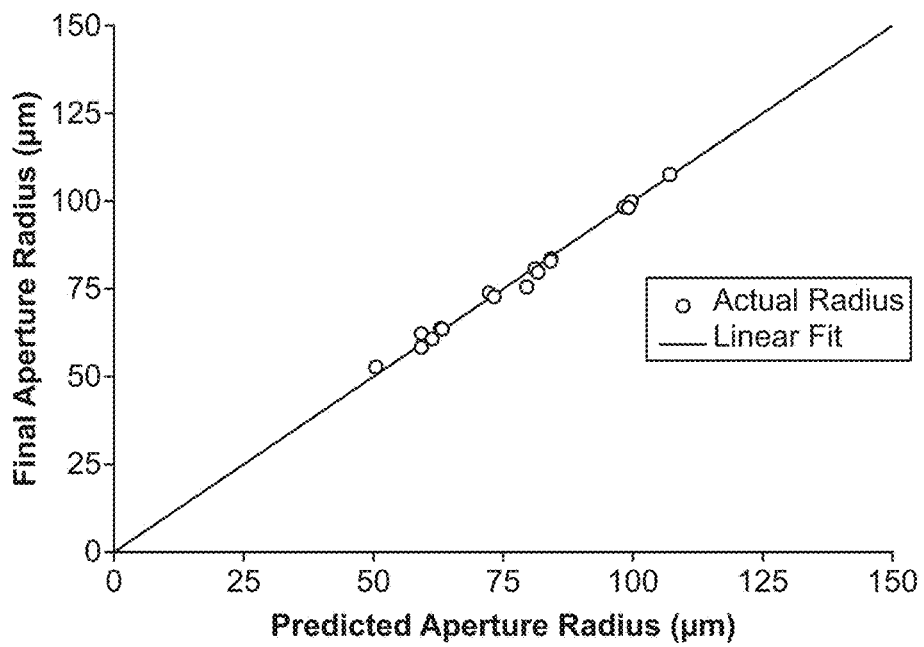
FIG. 5B
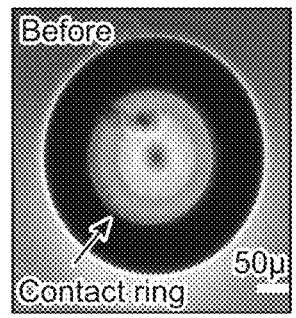 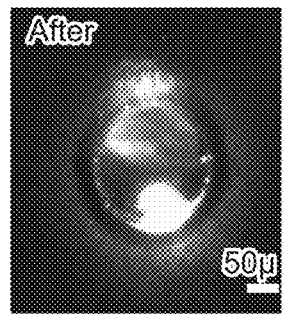
FIG. 5C  FIG. 5D

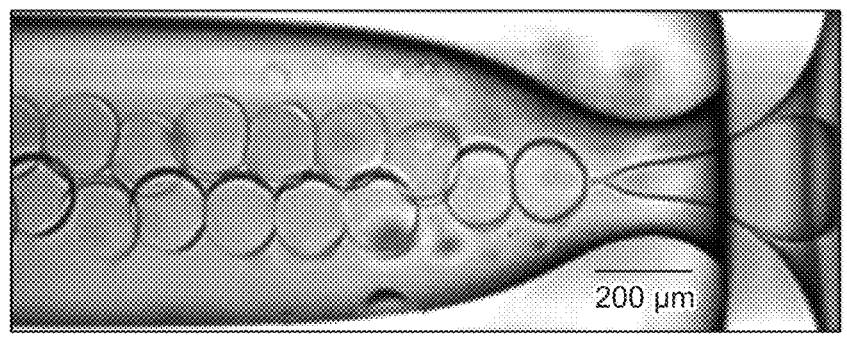
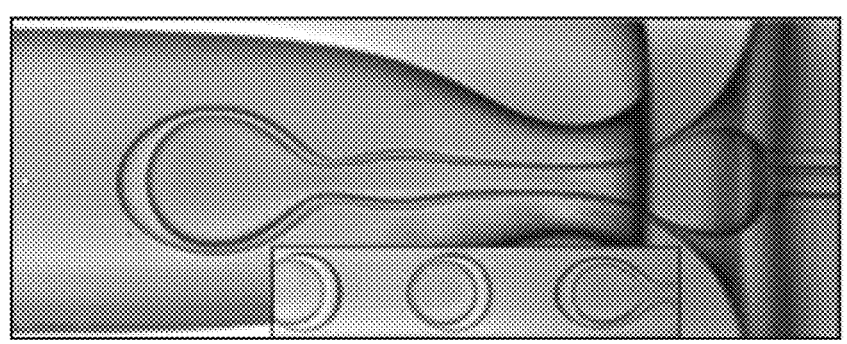
FIG. 8
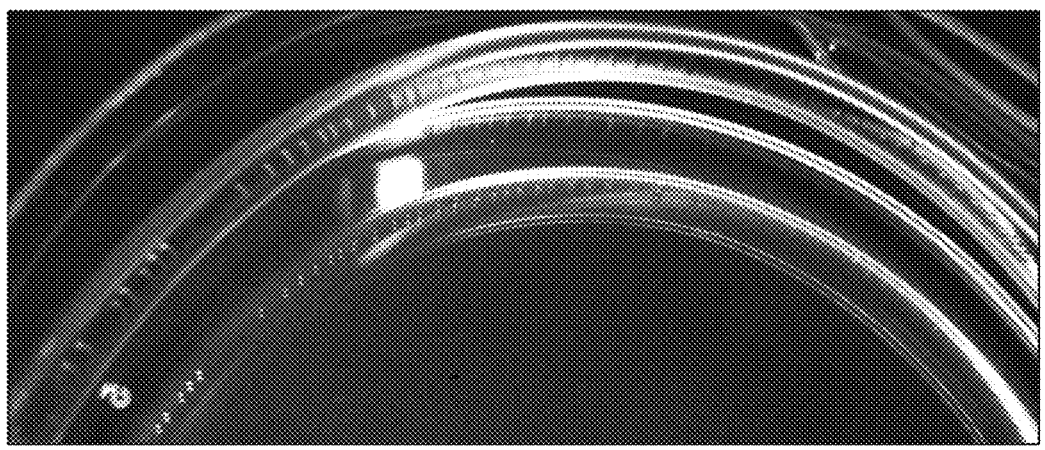
FIG. 9

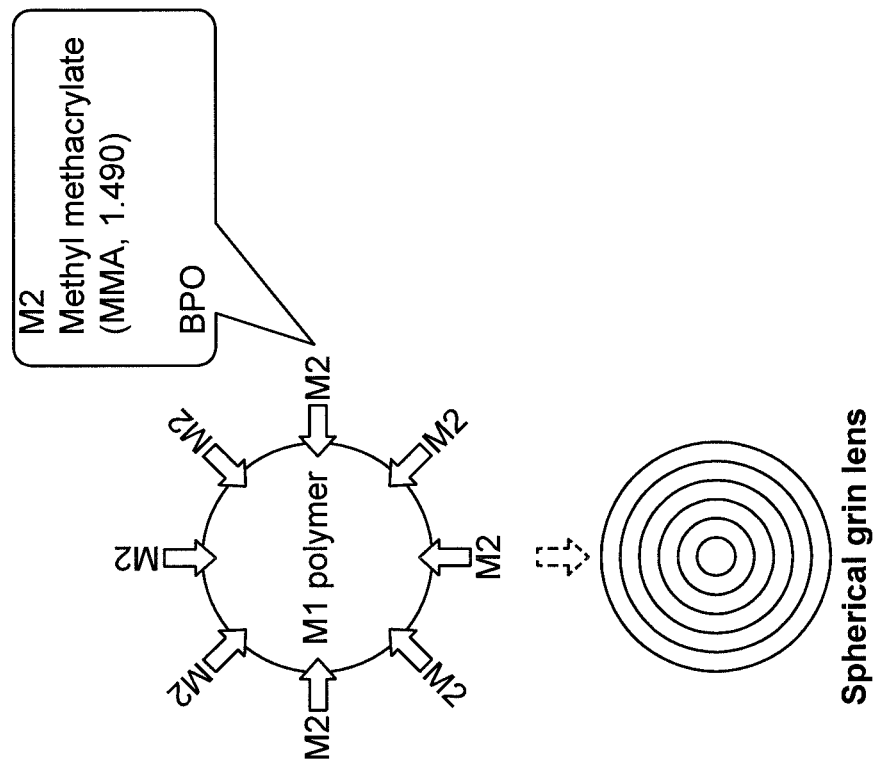
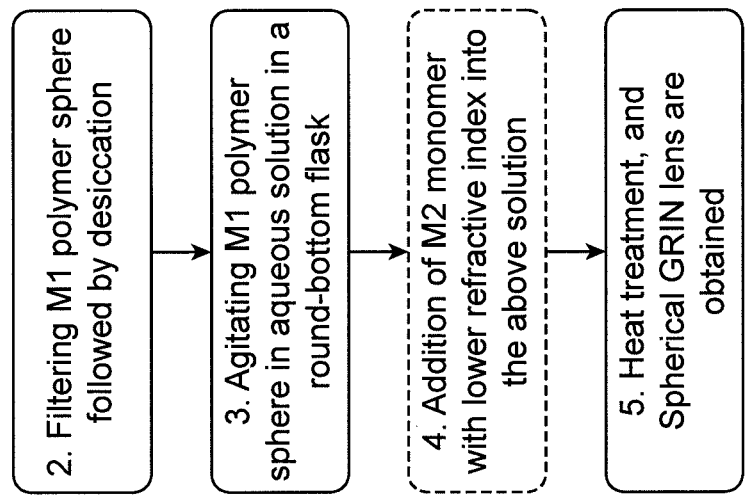
FIG. 14

OPTICAL LENS FABRICATION

CROSS REFERENCE TO RELATED APPLICATIONS

This application claims the benefit under 35 U.S.C. 119 of U.S. Provisional Patent Application No. 61/790,436 filed Mar. 15, 2013, titled "Optical Lens Fabrication", which is incorporated by reference as if fully set forth herein.

STATEMENT REGARDING FEDERALLY SPONSORED RESEARCH OR DEVELOPMENT

This invention was made with Government support under contracts RR025742 and TW008781 awarded by the National Institutes of Health. The Government has certain rights in this invention.

INCORPORATION BY REFERENCE

All publications and patent applications mentioned in this specification are herein incorporated by reference to the same extent as if each individual publication or patent application was specifically and individually indicated to be incorporated by reference.

FIELD

The preset disclosure relates generally to lenses, such as optical lenses that can be used in microscopes.

BACKGROUND

An optical instrument is an instrument used to move light along a specified path or paths. Microscopes are common, general-purpose optical instruments. Other optical instruments include interferometers and spectrophotometers. Microscopes are generally used to view objects that are too small to be seen by the unaided eye. Optical microscopes use visible light and a system of lenses to magnify images of small objects. High magnification optical microscopes are often heavy and take up much volume. There is a need for improved optical lenses for use in optical instruments.

SUMMARY OF THE DISCLOSURE

Methods for preparing lenses are disclosed herein. In some embodiments the methods include placing one or more lenses between a first substantially planar surface and a second substantially planar surface. The second substantially planar surface is substantially parallel to the first substantially planar surface. The distance between the first and second substantially planar surfaces is adjusted such that the first and second substantially planar surfaces contact opposing sides of the one or more lenses. The surface area of the first and second substantially planar surfaces contacting the opposing sides of the one or more lenses is verified. An exposed portion of the surface of the one or more lenses between the first and second substantially parallel plates is coated with an opaque material to form one or more coated lenses. In some embodiments the one or more lenses can be gradient-index lenses.

In some embodiments coating the exposed portion of the one or more lenses can form an effective aperture on the lens defined by one or more uncoated surfaces on the one or more lenses. In some embodiments the uncoated surfaces correspond to the surface area of the first and second substantially planar surfaces contacting the opposing sides of the one or more lenses.

In some embodiments the methods further include optically measuring an effective aperture of the one or more lenses. In some embodiments reflective light microscopy is used to measure the effective aperture of the one or more lenses. In some embodiments a paired phase contrast objective and phase contrast illumination are used to measure the effective aperture of the one or more lenses.

In some embodiments the one or more lenses are substantially spherical lenses. In some embodiments the one or more substantially spherical lenses have a diameter of about 300 μm to about 1,000 μm. In some embodiments the spherical lens has an aperture of about ¼ to about ⅔ of the diameter of the substantially spherical lens.

In some embodiments coating includes introducing a liquid polymer source between the first and second substantially parallel plates and curing the polymer source to form the opaque material.

In some embodiments the first and second substantially planar surfaces include a compressible material. In some embodiments the first and second substantially planar surfaces include a polymer. In some embodiments the first and second substantially planar surfaces include polydimethylsiloxane (PDMS).

In some embodiments the methods further include separating the one or more coated lenses. In some embodiments the methods further include installing the one or more separated coated lenses into a flat material that can be configured to form an optical microscope.

In some embodiments the distance between the substantially planar surfaces when the first and second substantially planar surfaces contact opposing sides of the one or more lenses is between about 100 μm to about 1000 μm.

Lenses with coatings are also disclosed herein. The lens includes a substantially spherical polymeric material having a diameter of about 200 μm to 1000 μm with an opaque coating over a circumferential portion of an exterior surface of the lens. The opaque coating defines a first uncoated portion of the polymeric material and a second uncoated portion of the polymeric material on an opposing side from the first uncoated portion. The first uncoated portion defines a first aperture and the second uncoated portion defines a second aperture. The lens can be a gradient index lens. The first aperture and second aperture can each have a radius of about ⅓ to about ½ of the diameter of the substantially spherical polymeric material.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 3 illustrates ray tracing plots for different spherical lenses.

FIG. 5A illustrates a schematic for processing a lens in accordance with an embodiment.

FIG. 5B illustrates predicted aperture size versus final aperture radius for lenses processed in accordance with the methods disclosed herein.

FIG. 5C illustrates an image of a spherical lens in contact with the polydimethylsiloxane (PDMS) plates. FIG. 5D illustrates a spherical lens after coating a portion of the lens to form an aperture having a desired size.

FIGS. 8A-8B are images of microfluidic devices for fabricating a lens in accordance with embodiments.

FIG. 9 is an image of lenses manufactured in accordance with an embodiment.

FIG. 14 is a schematic illustration of a part of a method for producing GRIN lenses in accordance with an embodiment.

DETAILED DESCRIPTION

The present disclosure relates to methods for manufacturing small optical lenses. Also disclosed herein are methods for coating small lenses to form an effective aperture on the lens with a controlled size. Apertures having arbitrary sizes can be manufactured for micro-scale ball lenses using the methods disclosed herein. The process can include capillary encapsulation of micro ball lenses via an opaque polymer squeezed between two flat sheets. The pressure applied on the top film provides a measure to tune the aperture. After obtaining the desired aperture and visualizing it optically using phase contrast microscopy, a liquid polymer can be flown which is cured to obtain the final aperture.

The lenses and methods disclosed herein can be useful in optical microscopes. Optical microscopes that can be assembled from a flat material are disclosed in PCT/US2013/025612 filed on Feb. 11, 2013 and U.S. Provisional Application 61/597,682 filed on Feb. 10, 2012, the disclosures of which are incorporated by reference in their entirety. The optical microscopes can use the small lenses manufactured as disclosed herein. The small lenses are particularly useful in microscopes having a shorter optical path length over conventional optical microscopes.

Figure 1:
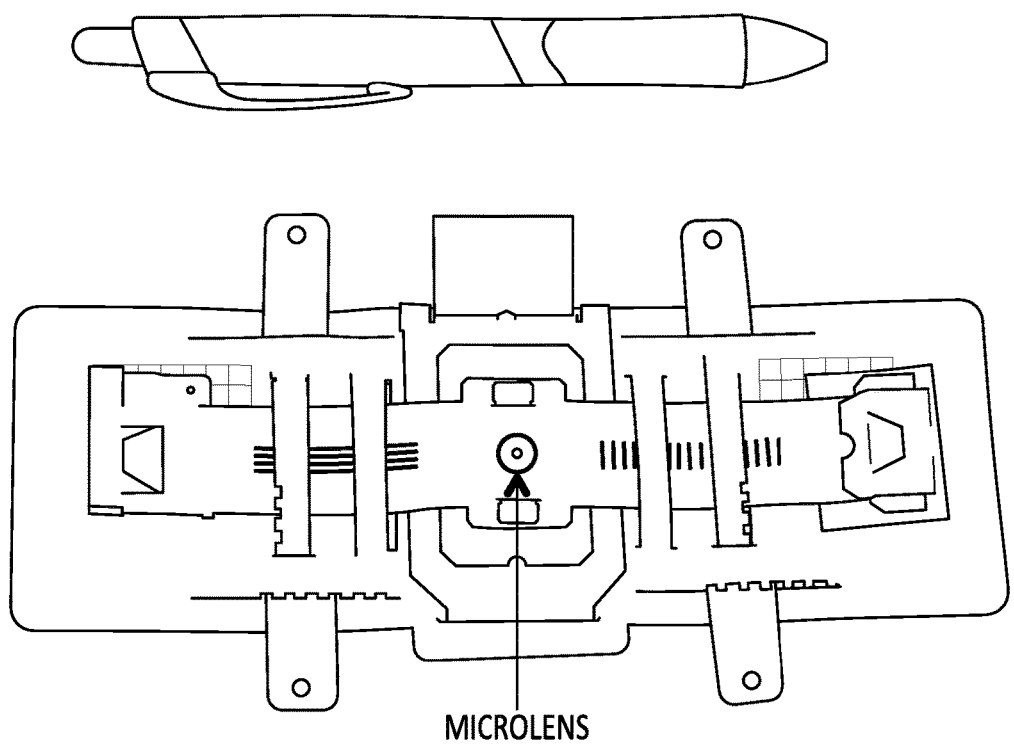
FIG. 1 is an image of an optical microscope assembled from a flat sheet of paper.

FIG. 1 is an image of an optical microscope assembled from a flat sheet of paper. It is desirable to use a microlens with low aberration for optical microscopes with a shorter optical path than conventional optical microscopes, such as the folding microscope illustrated in FIG. 1.

Figure 2:
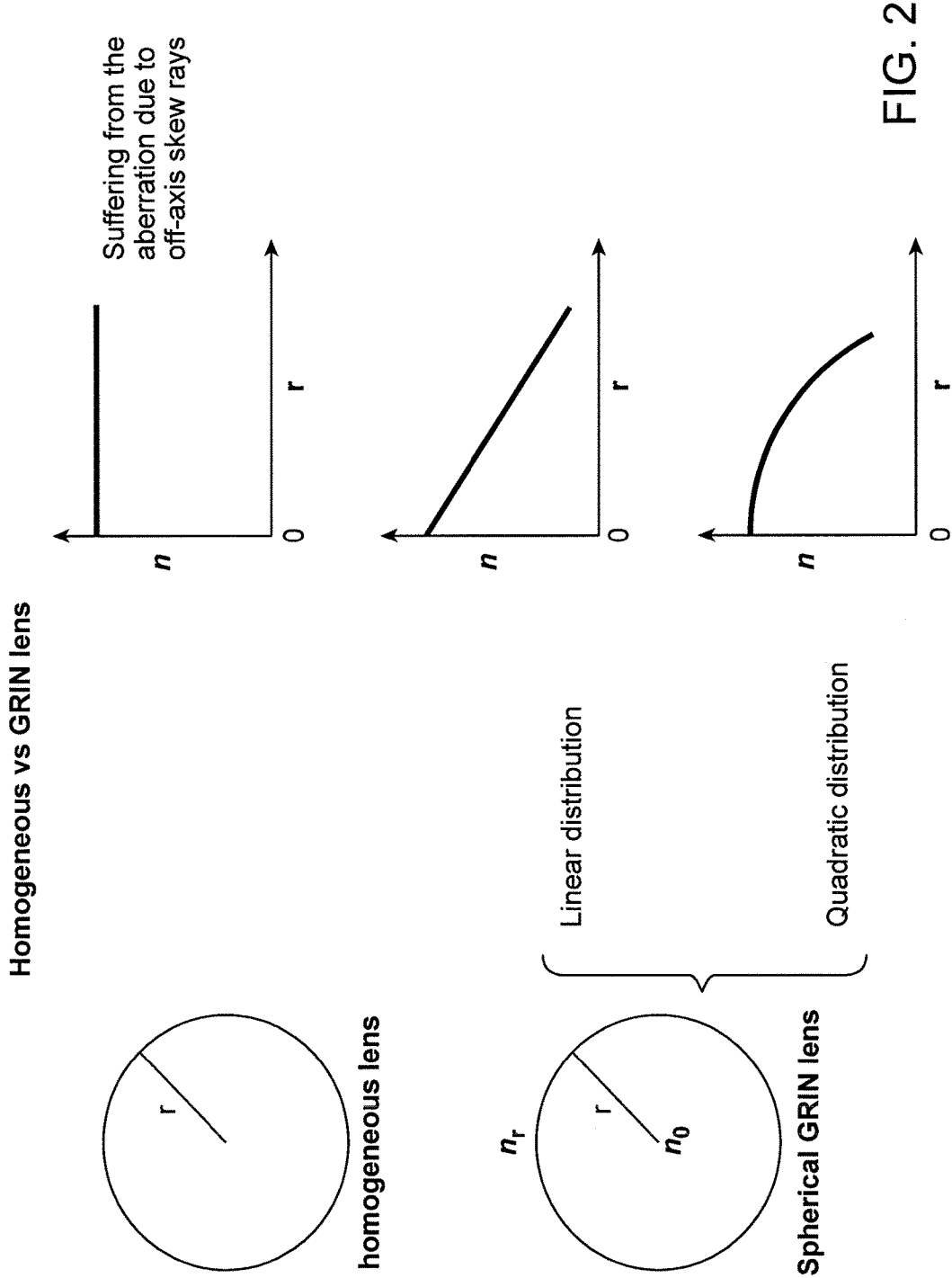
FIG. 2 is a schematic illustration of aberration for a homogenous lens compared to spherical gradient index (GRIN) lenses with a linear distribution and quadratic distribution.

FIG. 2 is a schematic illustration of aberration for a homogenous lens compared to spherical gradient index (GRIN) lenses with a linear distribution and a quadratic distribution. The homogenous lens suffers from aberration due to off-axis skew rays. The spherical GRIN lenses compare a linear distribution and quadratic distribution.

FIG. 3 illustrates ray tracing plots for different spherical lenses through an aperture and to an eye. The ray tracing plots were compared for a homogenous lens, linear distribution lens, and a quadratic distribution lens. The GRIN lens with the quadratic profile is preferable for reducing spherical aberration.

Figure 4:
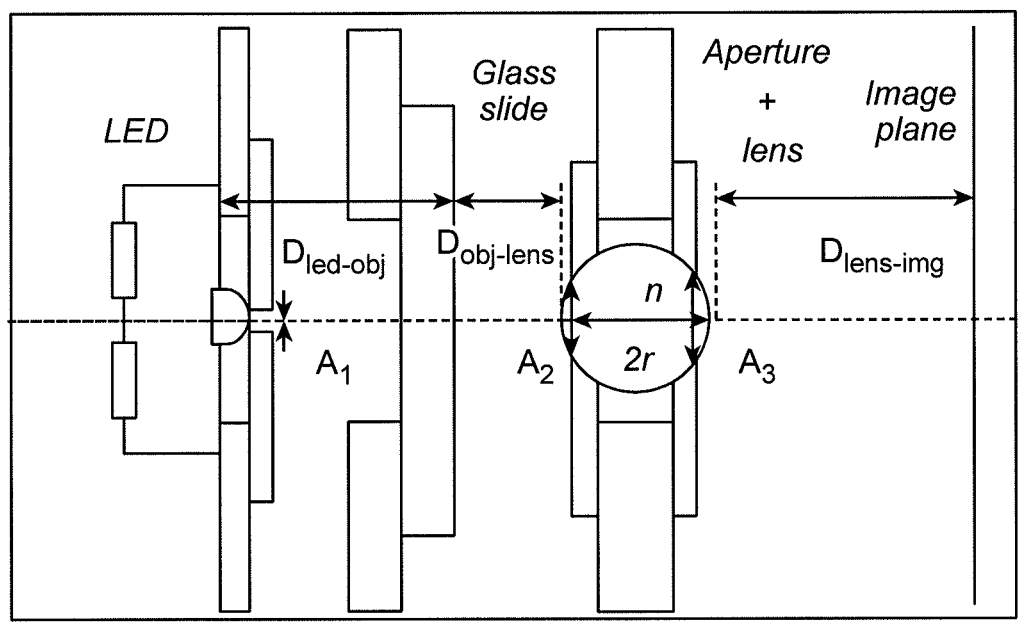
FIG. 4 illustrates an optical path for a microscope with a spherical lens.

FIG. 4 illustrates an exemplary optical path of an optical microscope in accordance with an embodiment. FIG. 4 illustrates the distance between the light source (e.g. LED) and sample object as $D_{led-obj}$, the distance between the sample object and lens as $D_{obj-lens}$, the distance between the lens and image plane as $D_{lens-img}$. The optical chain of the optical microscope includes illumination sources (distance $D_{led-obj}$), condenser lens, illumination aperture ($A_1$), sample glass slide, spherical micro-lens (radius r, refractive index n at a distance $D_{obj-lens}$ from the slide) and entrance ($A_2$) and exit ($A_3$) aperture. For a real image in projection mode, the image plane is a distance $D_{lens-img}$ apart. The total optical path length from the light source to the last lens surface can be about 2.5 mm, which is only about 1% of the optical path length for a conventional microscope. The decreased optical path length allows for the microscope to be constructed with a short vertical height assuming a vertical optical path. The reduced optical path length can also minimize the extent to which stray light can enter the system and degrade optical performance.

Apertures (e.g. $A_2$ and $A_3$) for micro optical systems are traditionally made via grinding. The methods disclosed herein allow for aperture formation utilizing polymer encapsulation of micro-lenses. The processes disclosed herein are advantageous over the conventional methods because the optical quality of the lens is preserved.

Methods for preparing a lens aperture are disclosed herein. The methods include placing one or more lenses between a first substantially planar surface and a second substantially planar surface. The second substantially planar surface is substantially parallel to the first substantially planar surface. The distance between the first and second substantially planar surfaces is adjusted such that the first and second substantially planar surfaces contact opposing sides of the one or more lenses. The surface area of the first and second substantially planar surfaces contacting the opposing sides of the one or more lenses is verified. An exposed portion of the surface of the one or more lenses between the first and second substantially parallel plates is coated with an opaque material to form one or more coated lenses. The one or more lenses can be gradient-index lenses. Coating the exposed portion of the one or more lenses can form an effective aperture (e.g. $A_2$ and $A_3$) on the lens defined by one or more uncoated surfaces on the one or more lenses. The uncoated surfaces correspond to the surface area of the first and second substantially planar surfaces contacting the opposing sides of the one or more lenses.

The first and second substantially planar surfaces can include a compressible material. The lens can be sandwiched between the two parallel planar surfaces. Preferably the planar surfaces have a thickness that is much larger than the lens diameter that is being processed. The first and second substantially planar surfaces can be a polymer, such as PDMS. Sylgard 184 PDMS (Dow-Corning) was used to form the planar surfaces. Both 10:1 and 20:1 ratios of PDMS to cross linker by mass were used and similar results were obtained. 10:1 mixtures were preferable to 20:1 as the 20:1 as PDMS can stick to the aperture material. A micrometer stage can be setup to precisely apply pressure on the planar films in order to tune the aperture radius. Phase contrast microscopy can be used to predict the resulting aperture size of the configurations.

Coating can include introducing a liquid polymer source between the first and second substantially parallel plates and curing the polymer source to form the opaque material. The polymer material used was Smooth-On Smooth-Cast Onyx Fast Polyurethane plastic. Other polymers can be used that cure to form an opaque coating. The uncured polymer can be applied as a liquid to surround a portion of the ball lens. The polymer cures into a solid matrix that can be easily altered, machined, and adhered to other components of the optical system. The one or more coated lenses can be separated and installed in a flat material. The flat material can be configured to form an optical microscope.

The effective aperture (e.g. $A_2$ and $A_3$) of the one or more lenses can be determined optically. Reflective light microscopy can be used to measure the effective aperture of the one or more lenses. For example, a paired phase contrast objective and phase contrast illumination can be used to measure the effective aperture of the one or more lenses. FIG. 5B illustrates predicted aperture size versus final aperture radius for lenses processed in accordance with the methods disclosed herein with 300 μm ball lenses.

FIG. 5A is a schematic illustration of an aperture manufacturing process in accordance with an embodiment. FIG. 5B illustrates the linear relationship between the desired aperture sizes and the sizes obtained using 300 μm ball lenses. FIG. 5A shows a schematic of sandwiching a microspherical ball lens between two spin-coated PDMS films. The setup can be imaged via an inverted phase contrast objective utilized to decipher the precise PDMS-glass contact line with the lens. At a desired contact radius an opaque polymer is flown via capillary action that hardens to form the aperture. Tight manufacturing tolerance can thus be achieved using this technique as shown in FIG. 5B. FIG. 5C illustrates an image of a spherical lens in contact with the PDMS plates. FIG. 5D illustrates a spherical lens after coating a portion of the lens to form an aperture having a desired size.

The one or more lenses can be substantially spherical lenses. A spherical lens is advantageous for manufacturing because it can minimize part count and be assembled without concern for rotational alignment. The lens can be sized based on the desired magnification of the optical microscope. The magnification varies inversely with the lens radius. For a high magnification, e.g. above 500×, the ball lens can have a small radius, such as below 0.5 mm. The small lens size allows for a thinner optical microscope thickness and smaller form factor. In some embodiments the lens has a diameter of less than about 2,500 microns. In some embodiments the lens has a diameter of about 1,000 μm to about 2,500 μm. In some embodiments the lens has a diameter of less than about 1,000 microns. In some embodiments the lens has a diameter of about 300 μm to about 1,000 μm. In some embodiments the lens has a diameter of about 200 μm to about 1,000 μm. In some embodiments the lens has a diameter of about 100 microns to about 1,000 microns. In some embodiments the lens has a diameter of about 100 microns to about 3,000 microns. In some embodiments the lens has a diameter of about 100 μm to about 300 μm.

In some embodiments the effective aperture ($A_2$ and $A_3$) of the substantially spherical lens can be less than the full diameter of the spherical lens. In some embodiments the aperture is about ¼ to about ⅔ of the diameter of the spherical lens. In some embodiments the spherical ball lens has an aperture diameter of about ¼ to about ⅓ of the spherical lens diameter. In some embodiments the spherical lens has an aperture diameter of about ⅓ to about ½ of the spherical lens diameter. In some embodiments the spherical lens has an aperture diameter of about ½ to about ⅔ of the spherical lens diameter.

The distance between the substantially planar surfaces when the first and second substantially planar surfaces contact opposing sides of the one or more lenses can be between about 100 μm to about 1000 μm.

In some embodiments half-ball spherical lenses can be used. In some embodiments a Wallston doublet lens is utilized. The Wallston doublet lens can be composed of multiple half ball lenses.

Lenses with coatings are also disclosed herein. The lens includes a substantially spherical polymeric material having a diameter of about 200 μm to 1000 μm with an opaque coating over a circumferential portion of an exterior surface of the lens. The opaque coating defines a first uncoated portion of the polymeric material and a second uncoated portion of the polymeric material on an opposing side from the first uncoated portion. The first uncoated portion defines a first aperture ($A_2$) and the second uncoated portion defines a second aperture ($A_3$). The lens can be a gradient index lens. The first aperture and second aperture can each have a radius of about ⅓ to about ½ of the diameter of the substantially spherical polymeric material.

The lenses can be formed using the methods described below, such as using UV-curable materials and by suspension polymerization.

Figure 6A:
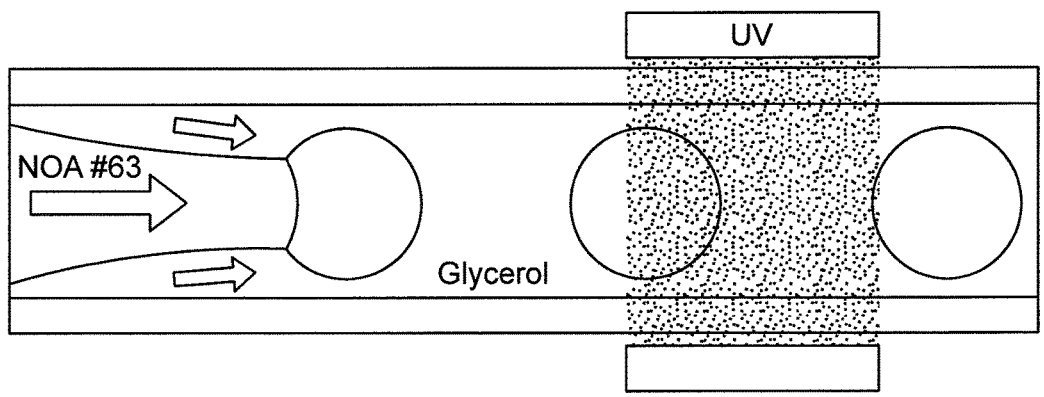
FIG. 6A is a schematic illustration of a method for fabricating a lens using UV light in accordance with an embodiment.
Figure 6B:
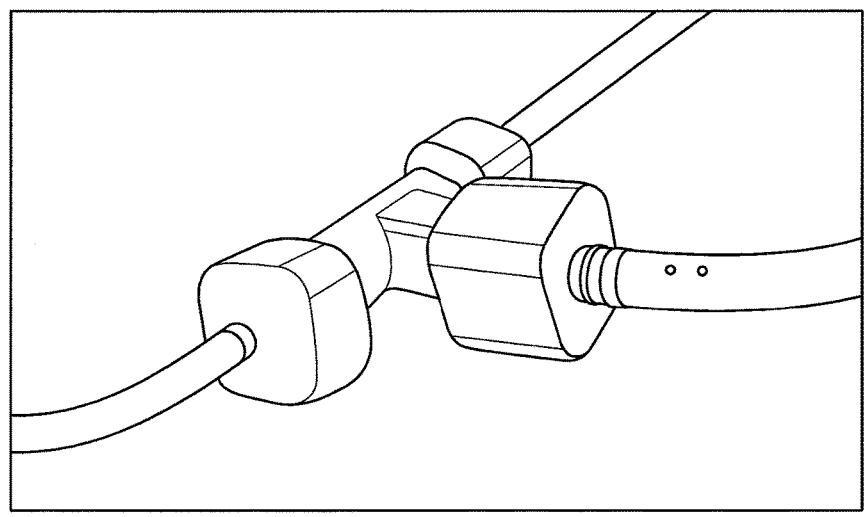
FIG. 6B is an illustration of a portion of device for lens fabrication.

FIG. 6A is a schematic illustration of a method for fabricating a lens using UV light in accordance with an embodiment. A polymer can be cured using UV light to form the lens. A polymer droplet having a small size can be emitted from a microfluidic device or nozzle. The polymer droplet can then be cured using UV light to form the lens. The polymer can be in a first emulsion and emitted through the microfluidic device into a second fluid or solvent. FIG. 6A illustrates the polymer droplet entering a glycerol stream. A number of process conditions can be set such that the polymer droplet and resulting lens has a desired size and shape. The process conditions include: surrounding material, surrounding flow rate, lens material, lens flow rate, outer capillary size, inner capillary size, inner capillarity profile, UV curing intensity and placement, additional layers for GRIN lens, etc. FIG. 6B illustrates an image of a configuration of tubing and UV light source that was used to produce lenses.

FIGS. 8A-8B are images of microfluidic devices for fabricating a lens in accordance with embodiments. FIGS. 8A and 8B illustrate two different designs of nozzles or jets that can be used to form the polymer droplet. Jetting can result in a wider radius with a higher flow rate as the jet can adhere to the wall of capillary.

FIG. 9 is an image of suspended lenses manufactured in accordance with an embodiment. The suspended lenses can be further sorted by size and shape. The suspended lenses can be further processed to modify their properties.

Figure 12:
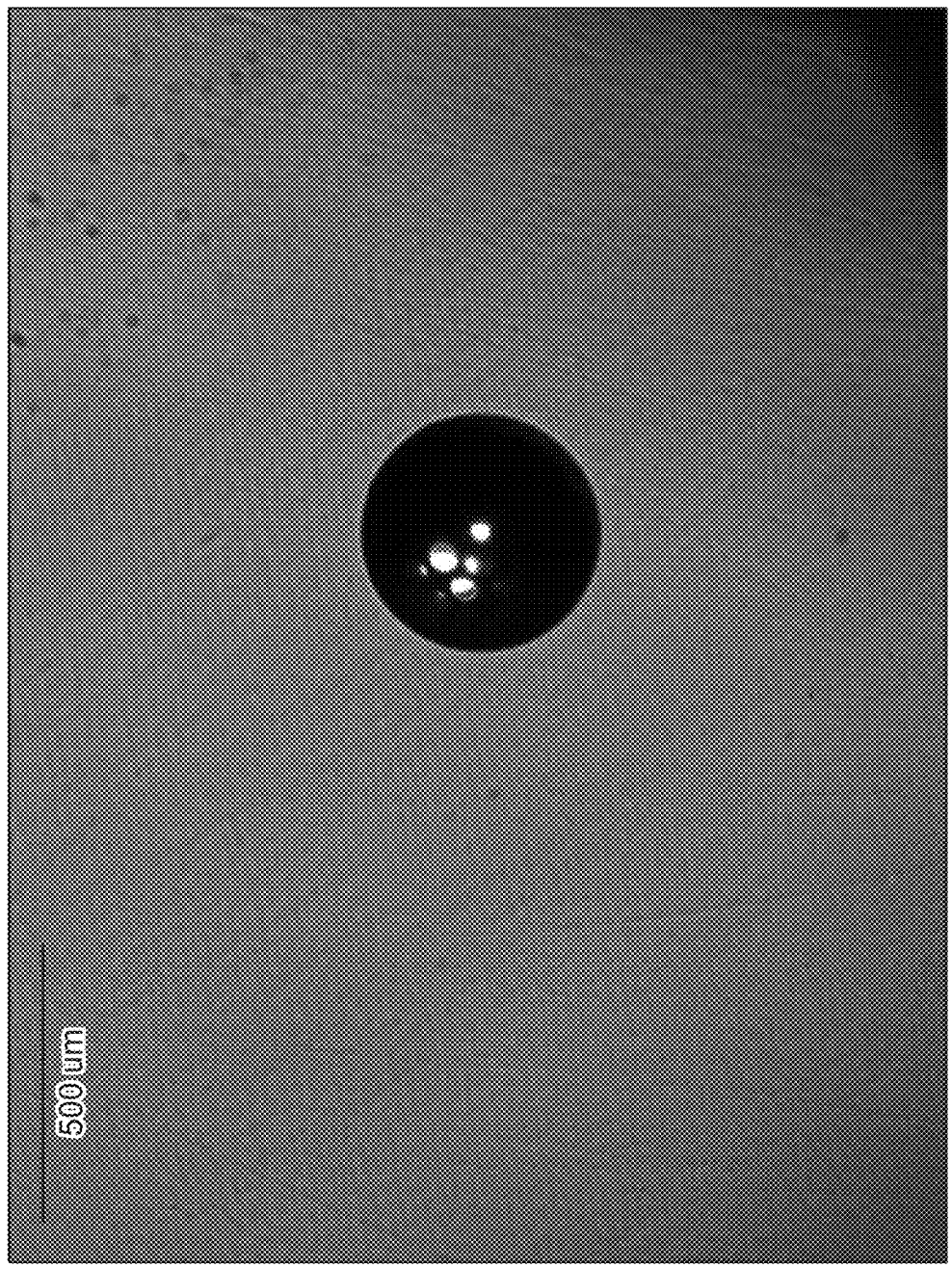
FIG. 12 is an image of substantially spherical lenses made in accordance with an embodiment.

FIGS. 10A-D are images of substantially spherical lenses made in accordance with embodiments. FIGS. 11A-D are images of the lenses illustrated in FIGS. 10A-D with circles superimposed about the diameters to illustrate the curvature of the lenses. The lenses shown in the images are high quality and show a substantially circular diameter. FIG. 12 is an image of substantially spherical lens made in accordance with an embodiment.

Figure 13:
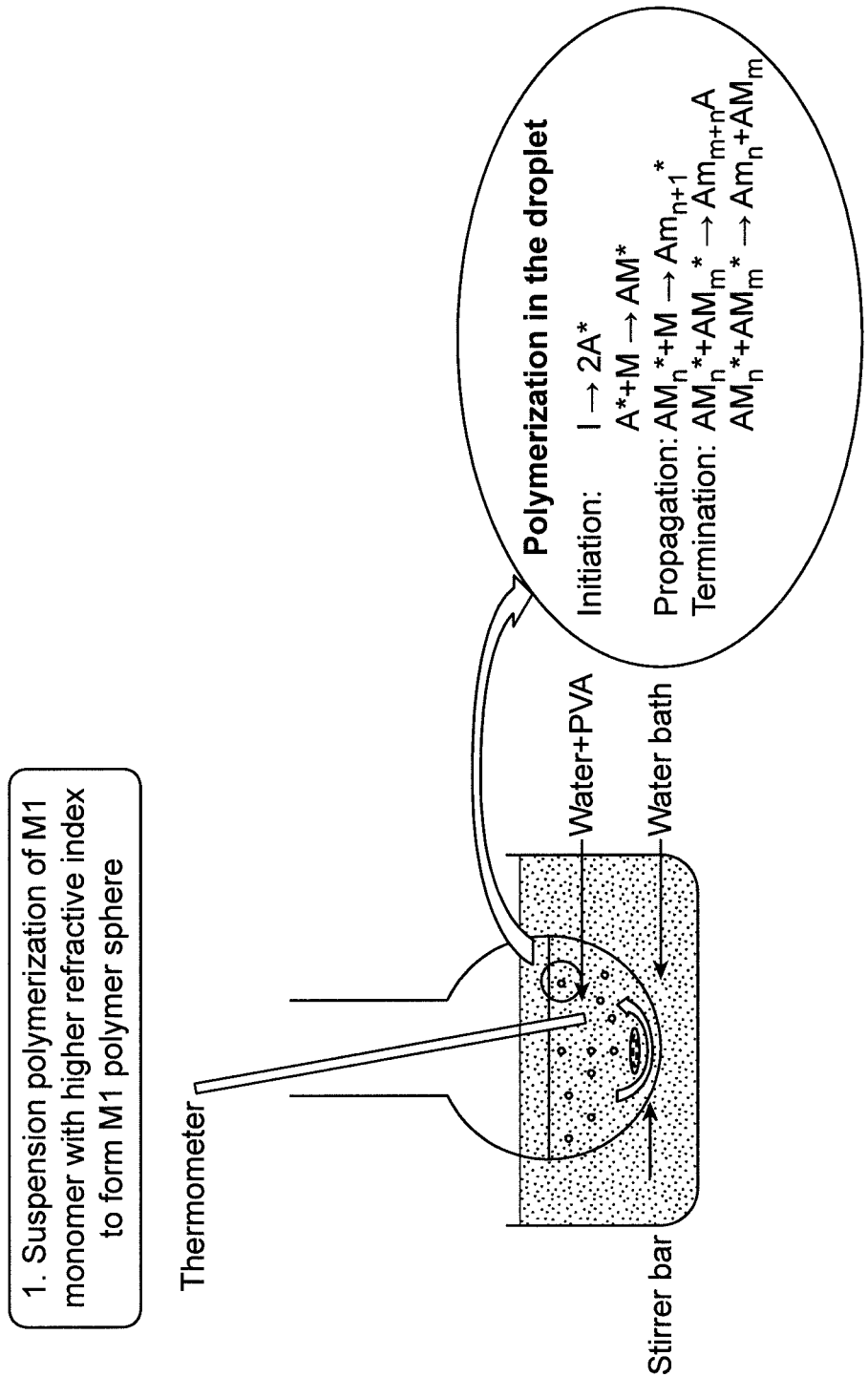
FIG. 13 is a schematic illustration of a part of a method for producing gradient index lenses (GRIN) in accordance with an embodiment.

FIGS. 13 and 14 illustrate portions of a suspension polymerization method for producing a GRIN lens with a quadratic index profile in accordance with embodiments. A first monomer (M1) can be used having a first refractive index. The first monomer can be suspended in a solution of water and a stabilizer. An initiator can be added to begin polymerization of the first monomer. The solution can be stirred and heated to control the reaction temperature. Polymerization can result in the formation of spherical polymers. An example of the first monomer is benzyl methacrylate (BzMA). Benzyl methacrylate has a refractive index of 1.568. An example of an initiator is benzoyl peroxide (BPO). An example of a stabilizer is polyvinyl alcohol (PVA). A water heat treatment of the first polymer spheres can be used to improve the quality of the spherical polymers and reduce irregular shapes.

After forming the first polymer spheres in solution, the polymer spheres can be filtered and dried. The polymer spheres can be added to a solution in second vessel. A second monomer (M2) can be added to the flask. The second monomer can have a lower refractive index than the first monomer. The reaction with the second polymer can be initiated such that the second monomer polymerizes and forms additional layers on the first polymer spheres. The formed polymer spheres can be used as GRIN lenses. An example of a second monomer is methyl methacrylate (MMA), which has a refractive index of 1.490. A water heat treatment of the second polymer spheres can be used to improve the quality of the spherical polymers and reduce irregular shapes. The formed spherical polymers can be filtered and dried and further processed to be used as lenses.

Figure 15:
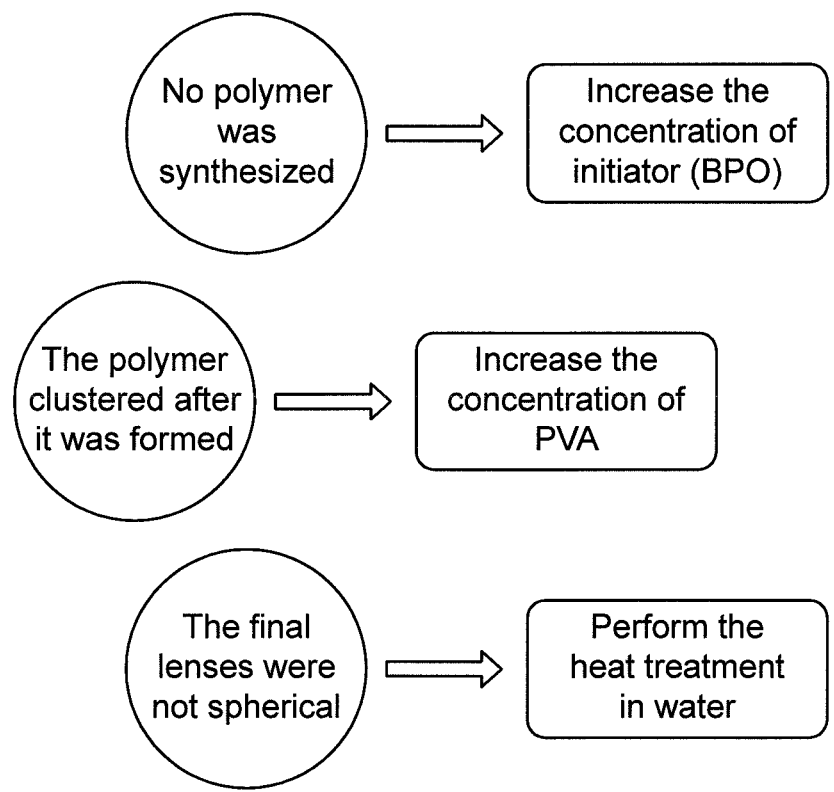
FIG. 15 illustrates process parameters that can be adjusted in the processes illustrated in FIGS. 13 and 14.

FIG. 15 illustrates process parameters that can be adjusted in the processes illustrated in FIGS. 13 and 14. For example, if no polymer is synthesized the concentration of the initiator can be increased. If the polymers are clustered together then the concentration of the stabilizer (PVA) can be increased. If the final lenses are not spherical then the lenses can be heat treated in water.

Figure 16C:
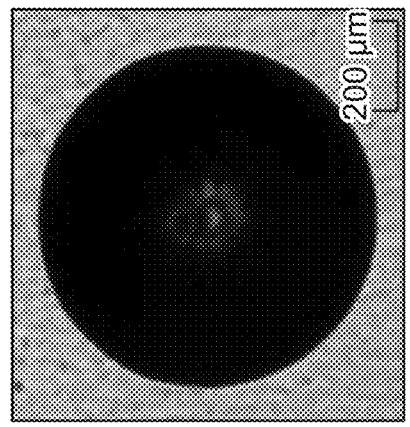
FIGS. 16A-16C illustrate images of GRIN lenses prepared in accordance with embodiments.
Figure 16B:
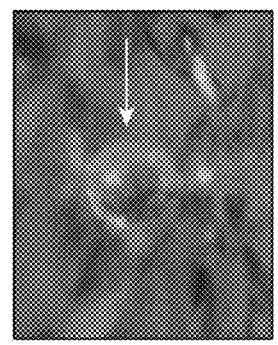
Figure 16A:
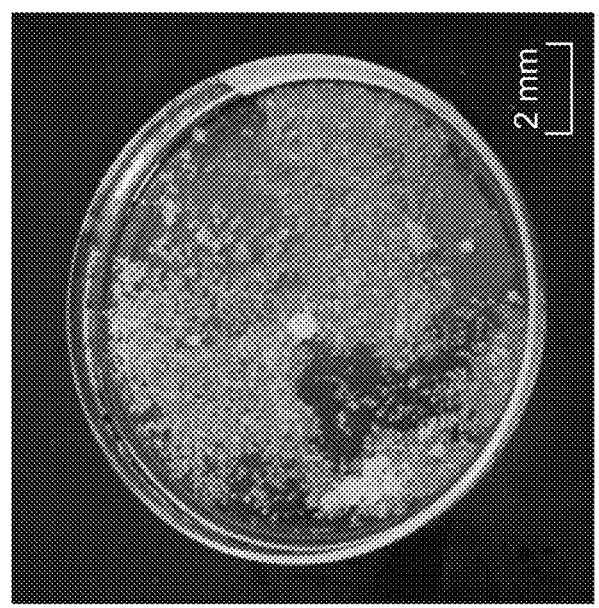

FIGS. 16A-16C illustrate images of GRIN lenses prepared in accordance with the methods illustrated in FIGS. 13-14. A batch of about 500 poly disperse GRIN lenses are shown having diameters of about 200 μm to about 1500 μm. An image of a magnified transparent lens is shown along with a GRIN lens having a 4× objective.

Figure 17:
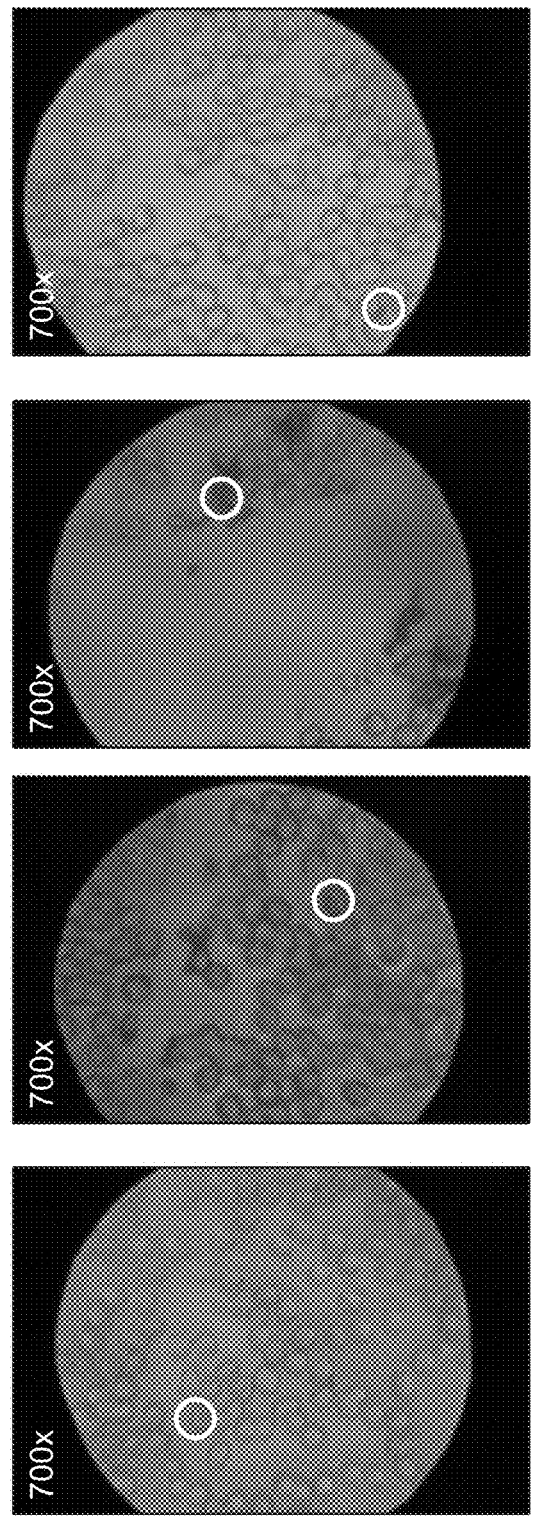
FIG. 17 illustrates images of a blood smear of *Plasmodium falciparum* under a magnification of 700× achieved using lenses prepared in accordance with embodiments.

FIG. 17 illustrates images of a blood smear of *Plasmodium falciparum* under a magnification of 700× achieved using lenses prepared in accordance with embodiments. A spherical GRIN lens was used with a 700 μm diameter.

Figure 18:
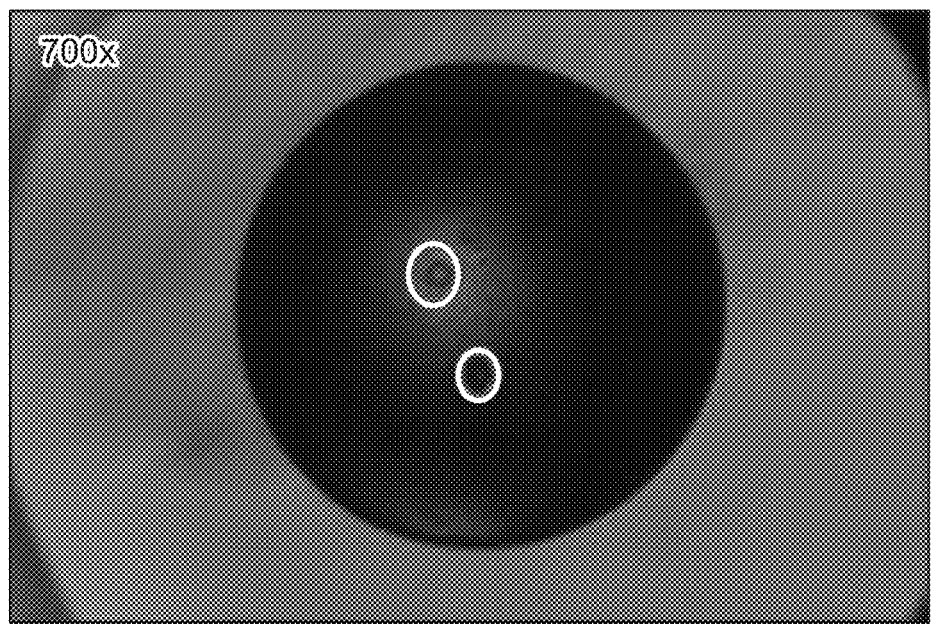
FIG. 18 is a magnified view of a GRIN lens manufactured in accordance with some embodiments.

FIG. 18 is a magnified view of a GRIN lens with some imperfections on the surface of the lens. The surface of the lens shows some dents and small bubbles. The probability of imperfections can be decreased by reducing impurities in the monomer and fine tuning process conditions.

Figure 7:
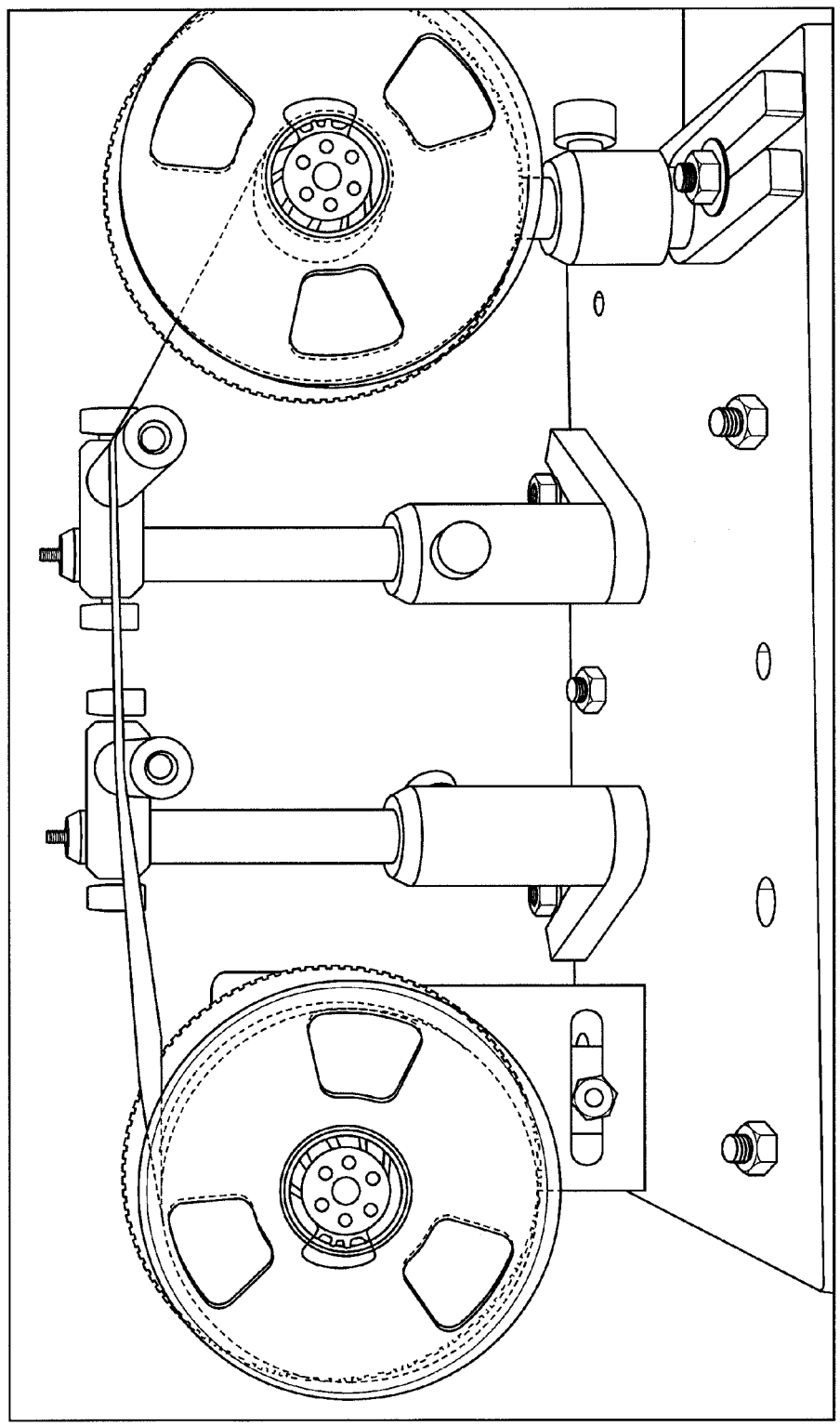
FIG. 7 is an image of a lens mounting assembly in accordance with an embodiment.
Figure 10A:
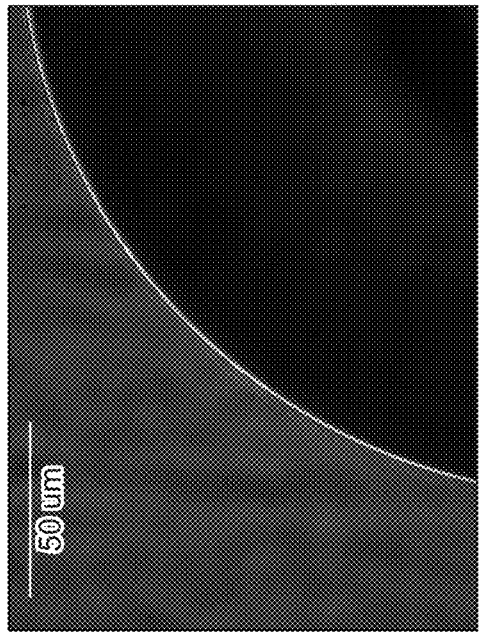
FIGS. 10A-D are images of substantially spherical lenses made in accordance with embodiments.
Figure 10C:
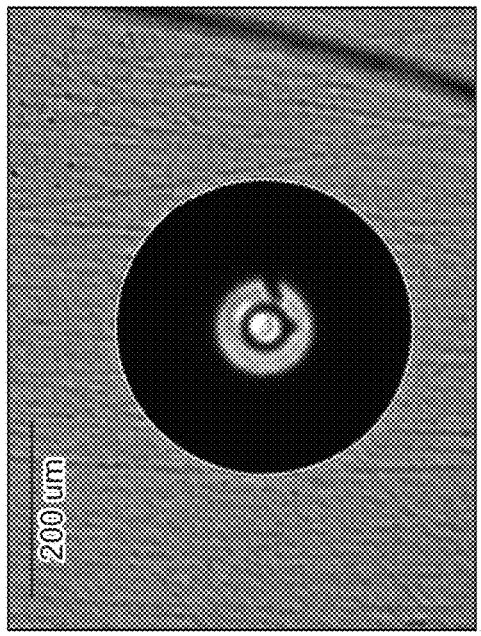
Figure 10B:
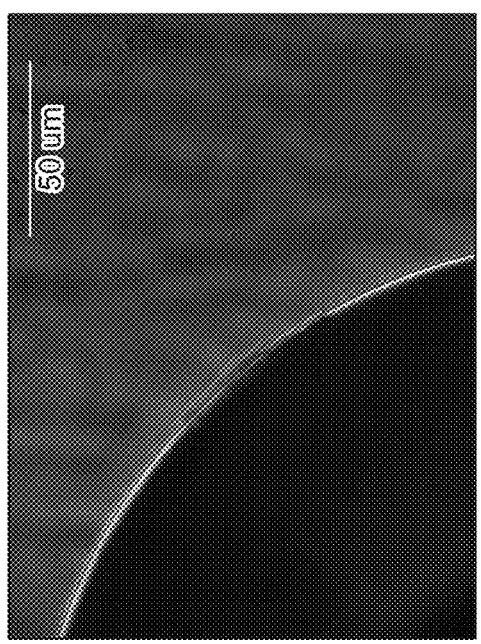
Figure 10D:
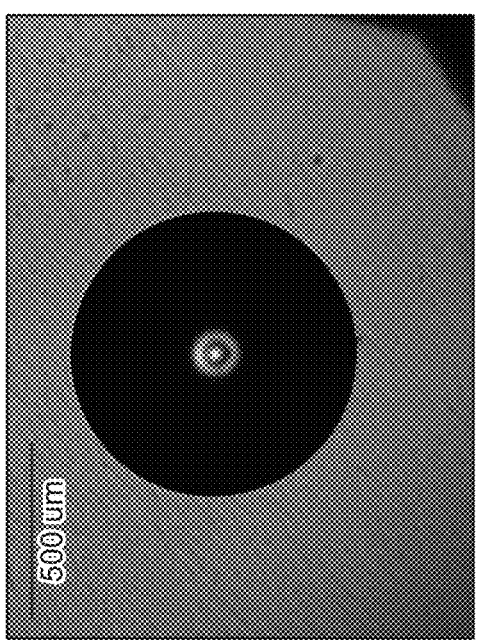
Figure 11A:
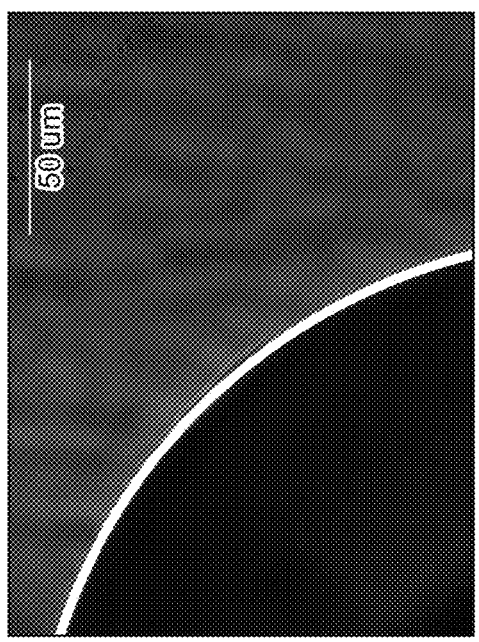
FIGS. 11A-D are images of the lenses illustrated in FIGS. 10A-D with circles superimposed about the diameters to illustrate the curvature of the lenses.
Figure 11B:
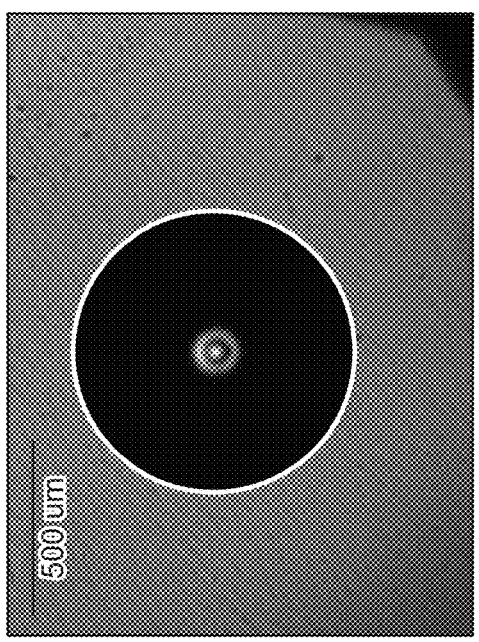
Figure 11C:
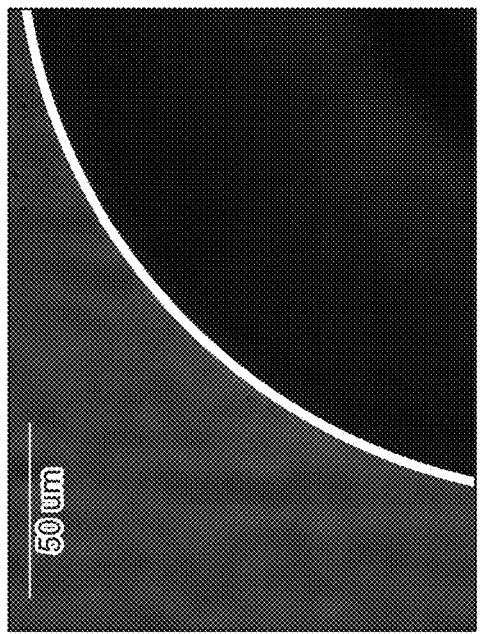
Figure 11D:
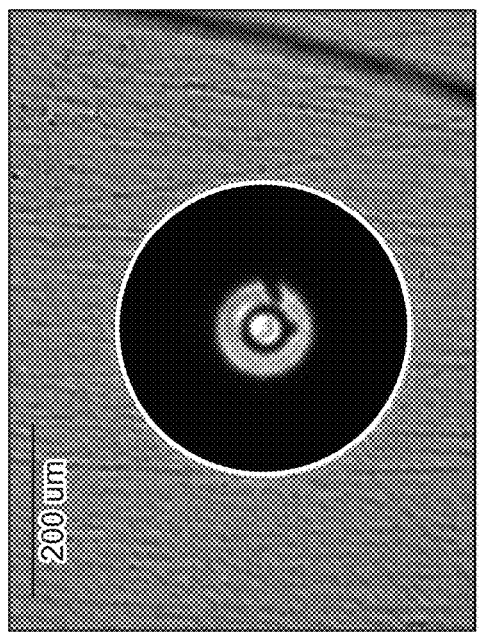

FIG. 7 is an image of a lens mounting assembly in accordance with an embodiment. The lens mounting assembly can include a conveyor belt with the lenses mounted to a material on the conveyor belt. A number of process parameters can be used to modify the lens mounting process. Process parameters include: conveyor design, conveyer speed, conveyer motion (e.g. steady versus staggered), conveyor material, alignment, lens size, motor torque, motor controller, motor-reel attachment, and any variables relating to the lens fabrication. After the lens is mounted, the mounted lens can be separated from the other mounted lenses. The mounted lens can be further processed as required, such as adding a coating to the lens or mounting on a flat material. The flat material can be configured or folded into an optical microscope.

EXAMPLE 1

The following step by step procedure was utilized for manufacturing lens apertures. Sylgard PDMS with a 10:1 ratio was prepared. The PDMS was mixed then poured onto a polished silicon wafer that had been treated with TCMS vapors for 20 minutes. Before pouring, the wafer was placed into a cylindrical container made of aluminum foil so that a thick, uniform layer of PDMS can be formed on the wafer. The wafer (with PDMS on it) was then vacuum desiccated for approximately 40 minutes and then baked at 60 degrees Celsius for approximately 2 hours in a level oven. If the oven is not level, the PDMS will not have parallel planar surfaces.

The PDMS was removed from the wafer and foil. A small section (1×1 cm$^2$) was cut. The surface was cleaned using scotch tape. The dry glass slide was cleaned using standard practices. One of the planar surfaces of PDMS was plasma bonded to the glass slide using standard practices. Oxygen or air plasma both work for bonding, although a corona treatment was used for this setup. The second glass slide was prepared the same way. These slides can be reused one to three times depending on how much care is taken during the rest of the procedure. Eventually, some of the black dye from the polyurethane would diffuse into the PDMS making it hazy and difficult to perform phase microscopy.

Next, the mechanical actuation was set up. One slide was fixed to a microscopy stage. The PDMS should be face up in a position so that the top surface of the PDMS can be seen through the microscope's objective. For a 300 μm lens, a 10× objective and 10× eyepiece were sufficient for making accurate measurements. The other slide was affixed to a planarizing device (a New Focus 9802 Center Mirror Mount was used since it has a hole in the center and can easily mount to optics equipment) that moved in the vertical direction by use of a micrometer stage. The PDMS surfaces were cleaned with scotch tape. The configuration was placed onto the microscope. The PDMS surfaces were aligned and actuated into and out of contact. Adjustments were made as necessary to ensure that the PDMS surfaces were parallel.

The assembly containing the top PDMS (the PDMS attached to the slide attached to the planarizing device) was removed and the micrometer stage was adjusted so that it is far out of contact from the other piece of PDMS. At least 3 lenses were placed with at least 1 mm spacing between them onto the bottom PDMS surface followed by reinstalling the top assembly (see FIG. 5A).

Optical feedback was then used to predict aperture size. A paired phase contrast objective and phase contrast illumination setup was used to observe the lens without bringing the top PDMS plate into contact with the lens. The image was focused such that the solid outline of the lens can be seen clearly (see FIG. 5C). Since the lens will focus light, there will be a bright area at the center of the lens and a dark region outside of that, the extent of that dark region, which should be circular if your lens is a spherical ball, should correspond to the size of the lens. Bringing the top piece of PDMS into contact with the lens will cause interference fringes to become visible. These fringes can be used to obtain a close estimate of the size of aperture that will be made as what is being observed here is the contact between PDMS and the lens. There are two regimes that were observed during the fabrication process: 1) The fringes lie in the brightest region close to the very center of the lens. Since the contrast here is not high, this puts the lower bound on the smallest possible aperture that can be made by this technique. 2) Many fringes become visible as the PDMS surfaces are brought closer together—this removes the crispness from the earlier case as the contact surface area is increased. Finally the bright fringe extends to be larger than the lens itself putting an upper limit on the largest apertures that can be produced.

Next, the aperture was created. Liquid polymers were mixed in accordance to the manufacturer's specifications. With the Smooth-Cast Onyx material that was used, 3 grams of mixture was mixed at a 1:1 ratio by mass and was sufficient to create an aperture covering the entire system. A bulb pipette was used to apply a droplet next to the gap between the two pieces of PDMS. Capillary forces were sufficient to pull the liquid into and throughout the region between the PDMS plates. The polyurethane was allowed to fully cure. Approximately 1 hour was used for the Onyx material. Once fully cured, the PDMS plates were pulled away from each other and the aperture material with embedded lenses were removed easily. The aperture sizes were then seen and measured as shown in FIG. 5D using reflected light microscopy.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. The present invention descriptions are intended to cover such alternatives, modifications, and equivalents as may be included within the spirit and scope of the invention as defined by the appended claims and otherwise appreciated by one of ordinary skill in the art.

What is claimed is:

1. A method for preparing a lens, comprising:
   placing one or more lenses between a first substantially planar surface and a second substantially planar surface, the second substantially planar surface being substantially parallel to the first substantially planar surface;
   adjusting a distance between the first and second substantially planar surfaces such that the first and second substantially planar surfaces contact opposing sides of the one or more lenses;
   verifying a surface area of the first and second substantially planar surfaces contacting the opposing sides of the one or more lenses; and
   coating an exposed portion of the surface of the one or more lenses between the first and second substantially parallel plates with an opaque material to form one or more coated lenses.

2. The method of claim 1, wherein the one or more lenses comprise gradient-index lenses.

3. The method of claim 1, wherein coating the exposed portion of the one or more lenses forms an effective aperture on the lens defined by one or more uncoated surfaces on the one or more lenses.

4. The method of claim 3, wherein the uncoated surfaces correspond to the surface area of the first and second substantially planar surfaces contacting the opposing sides of the one or more lenses.

5. The method of claim 3, further comprising optically measuring an effective aperture of the one or more lenses.

6. The method of claim 5, wherein reflective light microscopy is used to measure the effective aperture of the one or more lenses.

7. The method of claim 5, wherein a paired phase contrast objective and phase contrast illumination are used to measure the effective aperture of the one or more lenses.

8. The method of claim 3, wherein the one or more lenses comprise substantially spherical lenses.

9. The method of claim 8, wherein the one or more substantially spherical lenses has a diameter of about 300 µm to about 1,000 µm.

10. The method of claim 9, wherein the spherical lens has an aperture of about ¼ to about ⅔ of the diameter of the substantially spherical lens.

11. The method of claim 1, wherein coating includes introducing a liquid polymer source between the first and second substantially parallel plates and curing the polymer source to form the opaque material.

12. The method of claim 1, wherein the first and second substantially planar surfaces comprise a compressible material.

13. The method of claim 1, wherein the first and second substantially planar surfaces comprise a polymer.

14. The method of claim 1, wherein the first and second substantially planar surfaces comprise polydimethylsiloxane (PDMS).

15. The method of claim 1, further comprising: separating the one or more coated lenses.

16. The method of claim 15, further comprising installing the one or more separated coated lenses into a flat material that can be configured to form an optical microscope.

17. The method of claim 1, wherein the distance between the substantially planar surfaces when the first and second substantially planar surfaces contact opposing sides of the one or more lenses is between about 100 µm to about 1000 µm.

18. A lens comprising:
   a substantially spherical polymeric material having a diameter of about 200 µm to 1000 µm with an opaque coating over a circumferential portion of an exterior surface of the lens, the opaque coating defining a first uncoated portion of the polymeric material and a second uncoated portion of the polymeric material on an opposing side from the first uncoated portion, the first uncoated portion defining a first aperture and the second uncoated portion defining a second aperture.

19. The lens of claim 18, wherein the lens is a gradient index lens.

20. The lens of claim 18, wherein the first aperture and second aperture each have a radius of about ⅓ to about ½ of the diameter of the substantially spherical polymeric material.

\* \* \* \* \*